United States Patent [19]
Van der Gaag et al.

[11] 3,859,028
[45] Jan. 7, 1975

[54] MANDREL FOR PLUG ASSISTED SHAPING OF THERMOPLASTIC SHEETS

[75] Inventors: Gerrit Van der Gaag; Thomas C. Tomey, both of Delft, Netherlands

[73] Assignee: Shell Oil Company, New York, N.Y.

[22] Filed: Mar. 2, 1973

[21] Appl. No.: 337,329

[30] Foreign Application Priority Data
Mar. 21, 1972  Great Britain .................... 13130/72

[52] U.S. Cl. ................................ 425/403, 425/457
[51] Int. Cl. ............................................ B29c 17/02
[58] Field of Search ........... 425/403, 405, 383, 387, 425/388, 398, 399, 249, 352, 353, 412, 423, 469, 457, 468; 264/89, 92

[56] References Cited
UNITED STATES PATENTS

| | | | |
|---|---|---|---|
| 2,212,991 | 8/1940 | Sobel | 425/469 X |
| 3,551,954 | 1/1971 | Knowles | 425/398 |
| 3,568,254 | 3/1971 | Stolki | 425/388 |

*Primary Examiner*—Andrew R. Juhasz
*Assistant Examiner*—David B. Smith

[57] ABSTRACT

An improved apparatus for forming noncircular cupped articles from thermoplastic sheet by plug-assist drawing of the sheet in solid phase comprises a plug or mandrel with recessed sides in at least about the upper half of the mandrel. Plug-assist drawing of noncircular containers, such as square or rectangular containers having rounded edges, from thermoplastic sheet in the solid phase, utilizing a plug with recessed sides according to this invention, results in articles having greatly improved uniformity of wall thickness in the edges and sidewalls, when compared with drawing by means of a plug in which the sides are not recessed.

5 Claims, 4 Drawing Figures

PATENTED JAN 7 1975    3,859,028

A MANDREL FOR PLUG ASSISTED SHAPING OF THERMOPLASTIC SHEETS

BACKGROUND OF THE INVENTION

1. Field of the Invention

The invention relates to an apparatus and method for molding hollow articles from thermoplastic sheet.

2. Description of the Prior Art

The invention concerns an improvement in an apparatus comprising a mold having an open molding cavity, a clamping device for clamping a sheet of thermoplastic material around the opening of the molding cavity, a plug mounted for penetration into the molding cavity to draw material of the sheet into the cavity, and means for generating a fluid pressure differential across the walls of the drawn sheet to press it against the walls of the molding cavity.

Apparatus of this kind is known for molding hollow articles by the so-called "plug-assist" vacuum thermoforming process, in which a thermoplastic sheet, heated to a thermoforming temperature, is drawn out by the descending plug into the molding cavity, whereupon it is finally shaped in the desired form against the walls of the molding cavity by vacuum applied through the walls of the molding cavity. Use of such an apparatus is also known for other plug-assist molding methods, in which the sheet is molded in the solid phase below the thermoforming temperature or in which the fluid pressure differential is not created by the application of a vacuum but by the supply of a pressurized fluid, often compressed air.

Plug assist thermoforming of thin walled circular articles, typically from polystyrene, is illustrated, for example, in U.S. Pat. No. 2,891,280 to Politis, in which the apparatus and method are described in substantial detail. A variation of plug assist thermoforming is illustrated in U.S. Pat. No. 2,990,581 to Rowe, Jr. and another modification in U.S. Pat. No. 2,878,513 to Slaughter. Plug assist pressure forming of thermoplastic articles in the solid phase, utilizing similar apparatus, is illustrated in U.S. patent application Ser. No. 95,086 to Michaud et al, filed Dec. 4, 1970 now abandoned and in a continuation-in-part thereof, U.S. patent application Ser. No. 350,214 to Michand et al, filed Apr. 11, 1973. As explained by Mechaud et al, polyolefins such as high density polyethyelene and stereoregular polypropylene are desirable materials for conversion into cupped articles but their physical characteristics, including low melt viscosity, make them difficult to form at temperatures above the melting point because of excessive sheet sag. Michaud et al therefore propose a method and apparatus for forming such articles in the solid phase below the melting point of the polyolefin.

It is usually desirable, for obvious reasons, to produce drawn articles haaving as uniform a wall thickness as possible, or, in some cases, having wall thicknesses which vary in different parts of the container according to a desired distribution scheme. It is usually particularly desirable that the sidewall of the drawn article shown have as uniform as possible a thickness to meet a variety of requirements, including, for example, uniform strength and rigidity to permit stack of articles. The thickness tolerances acceptable to permit printing of sidewalls are also rather narrow. Further, if the article is a clear container, as described in said Michaud et al disclosure, variations in wall thickness would become visible by nonuniform transparency.

It has been found that solid phase molding of articles of uniform wall thickness is especially difficult in the case of articles of noncircular crossection, such as articles having a square or rectangular crossection. In plug assist thermoforming according to the prior art it has been found that the resulting container is usually thicker at the location where it has been in contact with the plunger than in other areas where no such contact has taken place. For example, containers made by the process described in U.S. Pat. No. 2,878,513 to Slaughter will be thicker at their base, where they contact the surface of the plug, than at their sidewalls, where they do not. It has now been surprisingly found that a different situation prevails in the production of noncircular containers by plug assist drawing of a thermoplastic sheet below its melting point. It was found, as illustrated by an example in the present specification, that in the forming of a container of rectangular crossection with rounded upright edges, wherein the plus is of a conventional type, the plastic material is stretched more at the upright edges of the container than at its sides, resulting in edges which are relatively thin, even though the material there is in contact with the plug. It is thought that this phenonomon may be due to the fact that during the descending movement of the plunger the sheet material forming the sides of the container is substantially stretched only in the direction of depth of the container whereas the sheet material in the rounded edges is stretched both in a vertical and horizontal direction.

It is of course desirable, in noncircular, such as quare or rectangular, drawn containers, to have the corner sections of the walls, i.e., the upright edges, at least as strong, if not stronger than the flat portions of the walls.

SUMMARY OF THE INVENTION

It is, therefore, an object of the invention to provide apparatus for plug assist molding of hollow articles from the thermoplastic sheet in solid phase in which the articles have an improved relatively uniform wall thickness distribution. In accordance with the invention, the plug or mandrel in the apparatus of the kind referred to above, over a substantial part of its length, has a cross-sectional configuration which includes recessed sides. When using a plug of this type, the thermoplastic sheet being drawn out by the descending plug has a greatly reduced area of contact with the plug, and thereby frictional contact of the sheet with the plug and possibly also premature cooling of the sheet by the plug is diminished. The sheet material between two spaced locations of contact with the plug can therefore be stretched without hindrance, with the result that the sheet is stretched and thinned uniformly over it length between these locations.

When making noncircular containers by solid phase forming as described, there is a tendency for the sheet to be stretched more at the upright edges of the container being formed than midway between these edges, so that the upright edges of the completed container are relatively too thin with respect to the sides. The strength of the container is mainly determined by the upright edges, which may act as a kind of stacking post when a series of the filled containers is stacked. It is therefore another object of the invention to provide apparatus which permits the molding of square, rectangular or other noncircular containers having relatively strong upright edges of uniform wall thickness.

BRIEF DESCRIPTION OF THE DRAWING

In the accompanying drawing.

DESCRIPTION OF THE PREFERRED EMBODIMENTS

Figure 1:
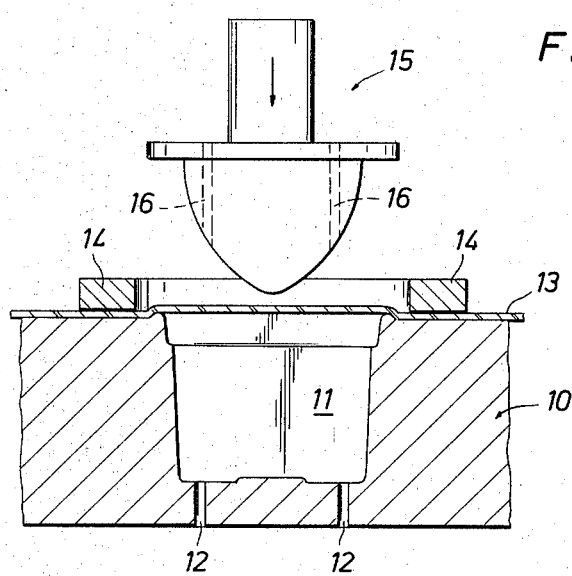
FIG. 1 is a diagrammatic representation of an apparatus for molding square containers.

This invention comprises apparatus for plug assist drawing of thermoplastic sheet in the solid phase to form cupped articles of noncircular cross-section, especially, containers of square or rectangular cross-section with rounded corners, and methods for such formation of such articles in the solid phase. The improvement of the present invention over similar apparatus and method of the prior art resides in the use of an improved plug or mandrel which, in the drawing process of this invention, results in the formation of articles of noncircular cross-section having improved uniformity of thickness in the sidewalls, including the upright edges. The cross-sectional configuration of the plug, referred to above, is generally a polygonal, e.g., rectangular or square, figure having rounded edges and recessed sides. Since the purpose of the recessed sides of the mandrel is to reduce the area of contact with the sheet, the shape of the recess is not very critical. Concavely curved sides will usually be found most satisfactory. The sides may be recessed over 70 percent or more of their span, up to 100 percent. "Span" is defined as the width of the tangent plane between two upright edges of the container, i.e., in section, the length of the tangent line between adjacent corners.

The cross-sectional configuration of the plug should broadly correspond with the shape of the molding cavity and therefore with the shape of the article to be molded. In other words, for making square or rectangular containers the plug should have a spanned circumference which is approximately square or rectangular. In vertical section through the axis of the plug, the configuration should preferably be parabolic. Most suitable, the plug should have a rounded, and rather pointed tip, whereby the area of contact between the sheet and plug is further limited and the finished article will contain less sheet material in the bottom and more in the side walls.

The improved mandrel or plug of this invention is a preferred embodiment which is illustrated in the drawing, comprises a base plate, a rim forming plate attached thereto, and a plug body attached to said plate. The plug body comprises an upper portion, adjacent to said plates, which, in section, in planes parallel to said plates, has the configuration of a modified polygon (typically a square or rectangle), the modification consisting of rounded corners and concave indentations of the sides comprising from 70–100 percent of the span between corners, (as defined above), and a lower portion converging from said indented to an unindented cross-section, preferably having an approximately parabolic vertical cross-sectin in horizontal cross-section, the lower portion will approach, for rectangular containers, an ellipse which, in the case of square containers, is a circle. The indented portion may suitably comprise between about 30 and 80 percent and preferably between about 40 and 60 percent, in total length, of the mandrel below the said plates.

The invention is particularly adapted for making noncircular cupped, i.e., hollow, articles from thermoplastic sheet, especially high-density polyethylene or polypropylene sheet, at a temperature below the melting point of the sheet material, in other words, by molding the sheet in the solid phase, in contrast with the well-known thermoforming techniques such as vacuum-forming in which the sheet is heated to a temperature above the melting or softening temperature. Therefore, the invention includes a method for molding hollow noncircular articles from thermoplastics sheet with the apparatus of the invention, the method comprising placing a sheet of thermoplastics material, in the solid phase at a temperature below its melting point, on the opening of the molding cavity, clamping the sheet in the clamping device, lowering a plug of the described configuration onto the sheet and into the molding cavity whereby material of the sheet is drawn into this cavity, and supplying fluid pressure between the plug and drawn sheet whereby the sheet is pressed against the walls of the mold cavity to form the hollow articles.

Figure 2:
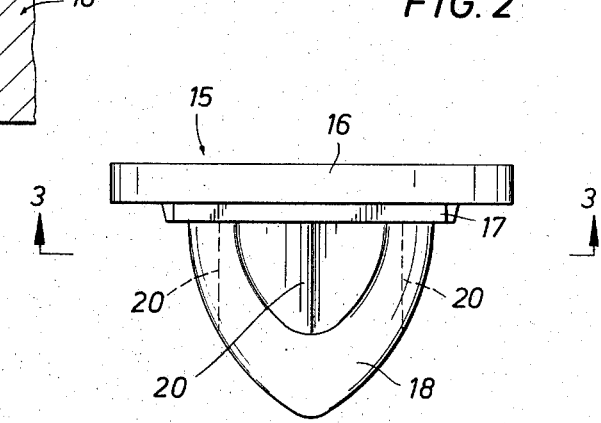
FIG. 2 is an elevation of the plug used in the apparatus of FIG. 1.
Figure 3:
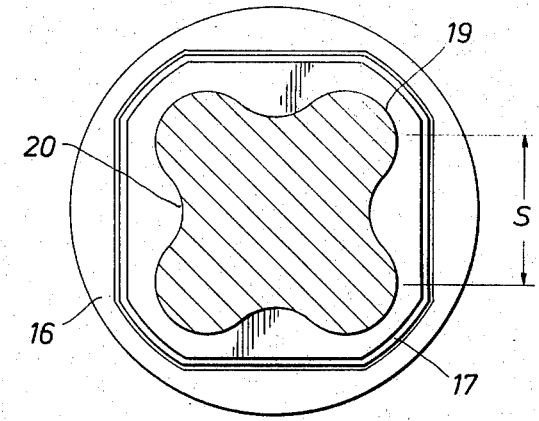
FIG. 3 is a cross-section along the line III—III of the plug shown in FIG. 2.

FIG. 1 shows in vertical section a mold 10 having an open molding cavity 11 with vent ports 12 in the bottom. A sheet 13 of thermoplastic material is laid over the molding cavity 11 and clamped on the mold by a clamping ring 14. The molding cavity 11 corresponds in shape with that of the article to be formed therein shown in FIG. 4. A vertically reciprocally movable plug 15 can be lowered on the clamped sheet 13 until the lower end of the plug is a few millimeters above the bottom of the molding cavity. Compressed air is then blown through air ducts 16 in the plug to press the sheet, drawn out into the molding cavity by the plug, against the walls of the molding cavity, the air between the sheet and walls of the cavity being driven out through the vent ports 12. Details of the construction, such as operating mechanisms for the plug and clamping ring and heating channels or heating elements for the plug and mold have been omitted since these are well-known. The design of the plug 15 which is typical for the invention is shown in FIGS. 2 and 3.

The plug 15 comprises a base plate 16, a rim-forming plate 17, and a plug body 18. The plug body 18 is the part of the plug penetrating into the molding cavity. The upper half of the plug body 18 has a cross-sectional configuration which can be seen in FIG. 3. The configuratin consists of round corners 19 and recessed sides 20. In the example shown, the sides 20 are recessed over 100 percent of their spans. The lower part of the plug body, i.e., that below the part the recessed sides 20, progressively approaches and becomes circular in horizontal cross-section and is parabolic in vertical section. The plug has a fully rounded tip.

When the sheet is being drawn into the molding cavity by the plug, it will contact the plug on the upper part thereof only at the four round upright edges 19. Therefore, between said edges the sheet can be stretched uniformly both in the horizontal and vertical direction. The parabolic shape of the lower half of the plug also reduces contact between the sheet and plug, thereby favoring a more uniform stretching of the central area of the sheet.

Figure 4:
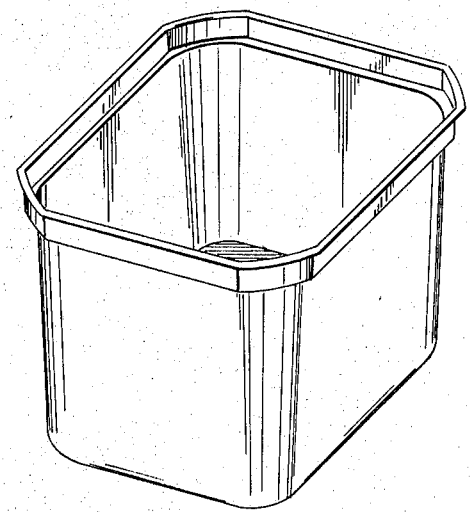
FIG. 4 is an isometric view of the molded square container.

The molded hollow article is shown in FIG. 4. Box-like containers can be formed by placing one such article upside down on top of another one and welding the opposite edges together. One of the two articles may have been molded with a different shape than the other one, so that for example bottle-like containers can be formed in this way. The two articles can be produced in the solid phase with clear walls, so that a clear bottle suitable for milk packaging can be made.

EXAMPLE

In accordance with the invention, the square container shown in FIG. 4 was molded from 0.7 mm thick polypropylene sheet held at a temperature of 150°C (melting pint of the polypropylene was 168°C). The container was 80 mm wide at the top and 63 mm wide at the bottom. The depth was 65 mm, and its volume 250 cm³. The container was molded using the plug shown in FIGS. 2 and 3, heated to 140°–150°C. The wall thickness of the container was measured both in the middle of a side wall and at an upstanding edge, in each case starting at the bottom edge of the container and then upwards at 1 cm intervals. The valves found are tabled below.

|  | Wall Thickness in mm | | Difference Between side wall and edge, mm |
|---|---|---|---|
|  | Side Wall | Edge |  |
| Top | 0.50 | 0.57 | .07 |
|  | 0.30 | 0.30 | .00 |
|  | 0.30 | 0.30 | .00 |
|  | 0.40 | 0.40 | .00 |
|  | 0.50 | 0.50 | .00 |
|  | 0.50 | 0.50 | .00 |
| Bottom edge | 0.30 | 0.30 | .00 |

The same container was molded under similar conditions but with a plug shaped fully as a paraboloid (not in accordance with the invention). In this case the values of the wall thickness were as follows.

|  | Wall Thickness in mm | | Difference between side wall and edge, mm |
|---|---|---|---|
|  | Side Wall | Edge |  |
| Top | 0.40 | 0.50 | .00 |
|  | 0.30 | 0.40 | .10 |
|  | 0.30 | 0.30 | .00 |
|  | 0.35 | 0.25 | .10 |
|  | 0.45 | 0.30 | .15 |
|  | 0.35 | 0.25 | .10 |
| Bottom edge | 0.25 | 0.10 | .15 |

We claim as our invention:

1. Mandrel for plug-assisted shaping of thermoplastic sheet into noncircular cupped articles having rounded corners, comprising
    a base plate,
    a rim-forming plate attached thereto,
    a plug body attached to said plates, said plug body comprising
        an upper portion, adjacent said rim-forming plate, which, in planes parallel to said plate, has the configuration of a modified polygon, the modification in cross-section, consisting of rounded corners and concave indentation of the sides comprising from 70 to 100 percent of the spans between corners, and
        a lower portion converging from said indented to an unindented configuration said unindented lower portion of the plug body being approximately elliptical in cross-section in planes parallel to the said plate and appoximately parabolic in cross-section in planes perpendicular to the said plate.

2. A mandrel as claimed in claim 1, in which said polygon is a rectangle.

3. A mandrel as claimed in claim 2 in which said rectangle is a square and said lower portion of the mandrel converges to an approximately circular configuration.

4. A mandrel as claimed in claim 1 in which the sides are recessed over approximately 100 percent of their span.

5. A mandrel according to claim 1, comprising fluid passages communicating through said base plate with a source of fluid under pressure and through the walls of said plug body with the space surrounding said plug body.

* * * * *